US012784067B2

(12) United States Patent
Pliner

(10) Patent No.: US 12,784,067 B2
(45) Date of Patent: Nov. 3, 2026

(54) CONTACT ROUTING SYSTEM

(71) Applicant: Afiniti AI Limited, Dublin (IE)

(72) Inventor: Vadim Pliner, Naples, FL (US)

(73) Assignee: AFINITI AI LIMITED, Dublin (IE)

( * ) Notice: Subject to any disclaimer, the term of this patent is extended or adjusted under 35 U.S.C. 154(b) by 236 days.

(21) Appl. No.: 18/222,049

(22) Filed: Jul. 14, 2023

(65) Prior Publication Data

US 2024/0020714 A1 Jan. 18, 2024

Related U.S. Application Data

(60) Provisional application No. 63/389,393, filed on Jul. 15, 2022.

(51) Int. Cl.
*G06Q 30/0202* (2023.01)

(52) U.S. Cl.
CPC ................................ *G06Q 30/0202* (2013.01)

(58) Field of Classification Search
None
See application file for complete search history.

(56) References Cited

U.S. PATENT DOCUMENTS

| | | | | |
|---|---|---|---|---|
| 7,340,408 | B1 * | 3/2008 | Drew | G06Q 30/0204 705/7.33 |
| 7,813,952 | B2 * | 10/2010 | Eskandari | G06Q 30/02 705/7.31 |
| 2013/0060587 | A1 * | 3/2013 | Bayrak | G06Q 10/10 705/7.11 |
| 2025/0193312 | A1 * | 6/2025 | Ibrahim | H04M 3/5175 |

OTHER PUBLICATIONS

Shapoval and T. Setzer, "Term of Contract and Portfolio Aware Churn Modeling in Telecommunication Campaigns," 2015 IEEE 17th Conference on Business Informatics, Lisbon, Portugal, 2015, pp. 26-3 (Year: 2015).*
Markey, R., "Are You Undervaluing Your Customers?", Harvard Business Review, Customer Experience, From the Magazine (Jan.-Feb. 2020) (22 pages).
Pliner, V., "Customer Lifetime Value Modeling", Verizon, Paper 7500-2016 (2016) (4 pages).
Cox, D. R., "Regression Models and Life-Tables", Journal of the Royal Statistical Society. Series B (Methodological), vol. 34, No. 2 (1972) (35 pages).
Brown, C. C., "On the Use of Indicator Variables for Studying the Time-Dependence of Parameters in a Response-Time Model", Biometrics 31 (Dec. 1975) (10 pages).
Allison, P. D., "Discrete-Time Methods for the Analysis of Event Histories", University of Pennsylvania (1982) (38 pages).
Potts, W., "Predicting Customer Value", Paper 073-30, Data Miners, Inc., (2005) (6 pages).

* cited by examiner

*Primary Examiner* — Chesiree A Walton
(74) *Attorney, Agent, or Firm* — Rothwell, Figg, Ernst & Manbeck, P.C.

(57) ABSTRACT

A method of determining a customer lifetime value (CLV) associated with a customer identifier (CID) is provided. The method comprises determining a hazard function associated with the CID based on a baseline hazard function and a coefficient value associated with CID; and calculating the CLV associated with the CID based on the determined hazard function. The determined hazard function is for calculating a probability that a customer associated with the CID will churn during a time interval.

20 Claims, 10 Drawing Sheets

CONTACT ROUTING SYSTEM

CROSS REFERENCE TO RELATED APPLICATIONS

This application claims priority to U.S. Provisional Patent Application No. 63/389,393, filed Jul. 15, 2022.

TECHNICAL FIELD

Disclosed are embodiments related to estimating a customer lifetime value.

BACKGROUND

Customer lifetime value (CLV) (a.k.a., lifetime customer value (LCV) or lifetime value (LTV)) of a customer is a prediction of a net profit contributed to future relationship with the customer. It is a measure of customer profitability and customer loyalty. CLV is a forward-looking metric, which may be extremely important for making better business decisions.

SUMMARY

Certain challenges presently exist.

A CLV of a customer of a service, a product, and or a company can be calculated based on a plurality of probability values each of which indicates a probability that the customer will churn (i.e., stopping to use a service or a product, or stopping from being a customer of a company) during a certain time interval in the future, and each of these probability values can be determined using a hazard function h(t) uniquely associated with the customer. For example, h(1) is a probability value indicating a probability that a customer will churn within the first month.

Good estimation of the hazard function h(t) for each one of many different customers, however, may be difficult.

Accordingly, in one aspect of this disclosure, there is provided a method of determining a customer lifetime value (CLV) of a customer. The method comprises determining a hazard function of the customer based on a baseline hazard function and a coefficient value associated with the customer and calculating the CLV of the customer based on the determined hazard function, wherein the determined hazard function is for calculating a probability that the customer will churn during a time interval.

In another aspect, there is provided a computer program comprising instructions which when executed by processing circuitry of an apparatus causes the apparatus to perform the method described above.

In a different aspect, there is provided an apparatus being configured to perform the method described above.

The embodiments of this disclosure provide an efficient way of determining the hazard function of each customer, thereby providing an efficient way of calculating the CLV of each customer.

BRIEF DESCRIPTION OF THE DRAWINGS

The accompanying drawings, which are incorporated herein and form part of the specification, illustrate various embodiments.

DETAILED DESCRIPTION

Figure 3:
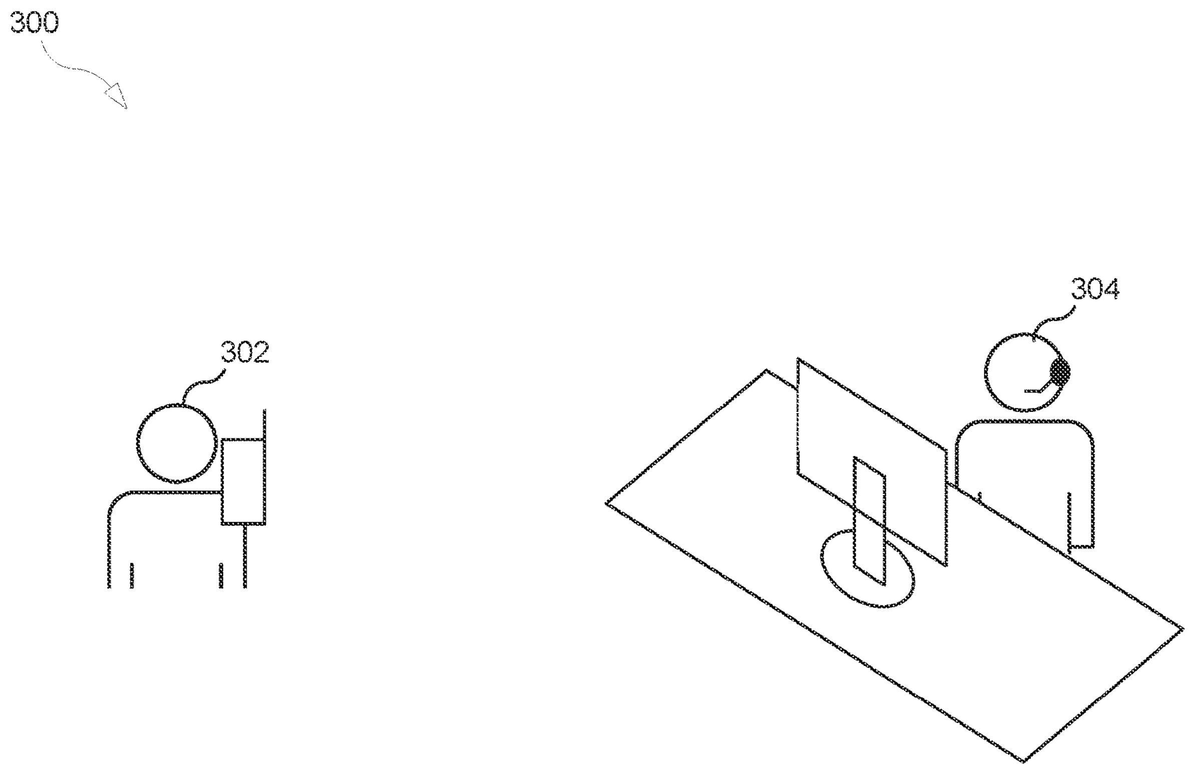
FIG. 3 illustrates an exemplary scenario 300 where embodiments of this disclosure can be implemented.

FIG. 3 illustrates an exemplary scenario 300 where embodiments of this disclosure can be implemented. In the scenario 300, a customer 302 is a customer of a credit card company. However, in different scenarios the customer 302 may be a customer of a different service or product and/or a customer of a company offering a different service or product.

There may be a situation where the credit card company wants to determine the CLV of the customer 302. For example, in case the customer 302 contacts an agent 304 of the credit card company to inform that the customer 302 wants to close his/her credit card account, the credit card company may decide, depending on the CLV of the customer 302, what promotion to offer to the customer 302 to dissuade him/her from closing the credit card account. If the CLV is high, the credit card company may offer to lower the interest rate by 3% while if the CLV is low, the credit card company may offer to lower the interest rate by just 1%.

Alternatively, depending on the CLV of the customer 302, the credit card company may decide which agent of the credit card company to speak to the customer 302 to persuade him/her to keep the credit card account. For example, if the CLV is high, the credit card company may pair the customer 302 with the best agent that is currently available while if the CLV is low, the credit card company may pair the customer 302 with any agent that becomes first available.

Mathematically, CLV may be expressed as:

$$CLV = \sum_{t=1}^{\infty} p_t \times M_t \times (1+r)^{-t} \tag{1}$$

where $p_t$ is a probability value indicating a probability that a particular customer will remain as a customer for a service, a product, and/or a company for the next t months (e.g., months, weeks, years, or any specified time periods), $M_t$ is the expected profit margin (i.e., revenue–costs) associated with the particular customer during month t (i.e., how much money a company is going to make from the customer), and r is the discount rate, which is the interest rate used to determine the present value of future cash flows. r accounts for the way the value of money is discounted over time. The concept is based on the premise that a dollar today is worth more than a dollar tomorrow.

As discussed above, $M_t$ is the expected profit margin (i.e., revenue–costs) associated with a customer during month t. But, data on individual customer's costs may not be readily available. Thus, instead of using the expected profit margin, expected revenues can be used as $M_t$. Alternatively, the future profit margin can be calculated based on the assumption that the future profit margin is constant and equal to either the latest customer's margin or the latest customer's average margin over several most recent time periods.

In case $M_t$ is not predicted and discounting r is not applied, the equation (1) above may be simplified to:

$$CLV = M \times \sum_{t=1}^{\infty} p_t \tag{2}$$

Another important parameter that is related to CLV metric is the remaining tenure (RT). The mathematical expectation of RT may be expressed as:

$$E(RT) = \sum_{t=1}^{\infty} p_t \tag{3}$$

In the above expression of RT, if the time unit t is in month (as an example), the value E(RT) in the equation (3) above is a mean value of a probability distribution of remaining tenure in months (a.k.a., the mean expected remaining tenure in months). Using E(RT), the equation (2) can be rewritten as:

$$CLV = M \times E(RT)$$

For simple explanation, the time unit (t) will be assumed to be in month but it can be any time interval such as 15 days, 2 months, 4 months, 1 year, etc. For practical reasons, RT is calculated up to a fixed number of months (instead of infinity as shown in the equations (1)-(3)).

Estimating $p_t$ lies in the scope of survival analysis (a.k.a., failure time analysis and event analysis), and two main functions in the survival analysis are hazard function and survival function. The hazard function—$h(t)=P(T=t|T\geq t)$—is a function for determining the probability that an event (e.g., customer churn) will occur during a certain time interval t. The survival function—$S(t)=P(T>t)$—is a function for determining the probability that a particular customer will remain as a customer for a service, a product, and/or a company for the next t months (e.g., months, weeks, years, or any specified time periods) (meaning that S(t) is equal to $p_t$ described above).

Estimating only one of the survival function and the hazard function is sufficient to determine the CLV because one of them can be derived based on another of them. More specifically, $$S(t) = S(t-1) \times [1 - h(t)], \tag{4}$$

$$\text{and thus, } S(t) = [1 - h(1)] \times [1 - h(2)] \times \ldots \times [1 - h(t)]. \tag{5}$$

Churn models and CLV models are closely related in the same way the hazard and survival functions are related. However, churn models typically predict churn over a much shorter time period (and they are good at that) as compared to a length of time period over which CLV models predict survival. Some embodiments of this disclosure try to take advantage of the predictive power of churn models to sensibly extend their predictions to longer periods of time.

As explained above, determining the hazard function h(t) for each of many different customers may be cumbersome and may not be efficient. Accordingly, there is provided a proportional hazards model for estimating values of a hazard function. The proportional hazards model of the embodiments of this disclosure is different from the well-known Cox proportional hazards model (a.k.a., the Cox regression described in Cox, David R. "Regression Models and Life-Tables." Journal of the Royal Statistical Society, Series B. 34 (2): 187-220, 1972).

In the proportional hazards model, each customer's hazard function may be expressed as:

$$h_i(t) = \alpha_i \times h_0(t) \tag{6}$$

where $h_0(t)$ is a baseline hazard function and $\alpha_i$ is a coefficient value of proportionality (a.k.a., the "proportionality value." The baseline hazard function is a hazard function over the whole customer base of interest and $\alpha_i$ is unique to a particular customer.

There are different ways of obtaining the baseline hazard function $h_0(t)$. In some embodiments, the baseline hazard function can be obtained by applying standard survival analysis technique(s) (e.g., the Kaplan-Meier method) to historical data in order to determine a survival function, and using the equation (4) above to obtain the baseline hazard function based on the determined survival function. In other embodiments, the baseline hazard function can be obtained by computing monthly churn rates of customers by tenure based on the historical data. More specifically, based on data indicating which customer churned during the last month and data indicating the tenure of each customer at the beginning of the last month, the churn rate of a different customer may be calculated, and the baseline hazard function can be determined based on the calculated churn rates.

The application of the Kaplan-Meier method requires historical data going back quite a distance in time. However, if a snapshot of data is taken as of at least a month ago, hazards (churn rates) can be computed by tenure. In fact, a snapshot is too strong of a word. All that is needed is customer tenures at some point in time and the churn status over a month after that point for each customer.

Estimates of the baseline hazard function beyond the scope of tenures in historical data may also be provided as going forward the existing customers' tenures will increase. Typically, the hazard function stabilizes beyond some point. To make sure this is the case, it is a good idea to plot the baseline hazard function to see such a point and compute the mean hazard/churn rate for tenures beyond that point. Then the hazard function values can be extrapolated using that mean for tenures higher than seen in historical data.

The customer proportionality value $\alpha_i$ can be calculated based on $h_i(t_0)/h_0(t_0)$ where $t_0$ is the current tenure of customer i. For example, $$\alpha_i = \frac{h_i(t_0)}{h_0(t_0)}.$$

In this disclosure, current tenure of customer i means a time period indicating how long the customer i was a customer of a certain service/product/company. Thus, $h_i(t_0)$ is a probability value indicating the probability that the customer i will churn over a next time period (e.g., the next month). $h_i(t_0)$ can be determined using a churn model (which is for predicting a probability that a customer will churn within a time period). A churn model is well known in the art, and thus the details of the churn model is not provided in this disclosure.

In case $$\alpha_i = \frac{h_i(t_0)}{h_0(t_0)},$$

for all $t \geq t_0$, the equation (6) can be can be expressed as:

$$h_i(t) = h_0(t) \times \frac{h_i(t_0)}{h_0(t_0)}. \quad (7)$$

Note that it is theoretically possible that some values of $h_i(t)$ in the equation (7) are greater than 1. In some embodiments, those values of NO may be set to 1.

Figure 4:
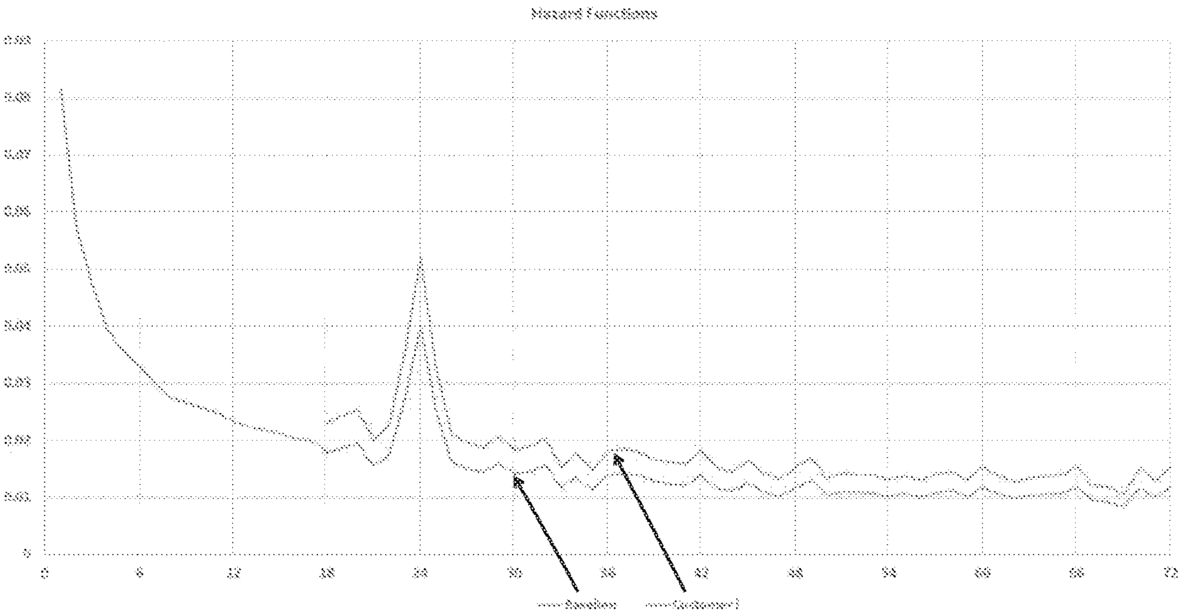
FIG. 4 shows an exemplary relationship between a baseline hazard function and a hazard function of a particular customer.

FIG. 4 shows an exemplary relationship between the baseline hazard function and a hazard function of customer i. In FIG. 4, the current tenure of the customer i is 18 months, and $\alpha_i$ is 1.3 (meaning that the probability that the customer i will churn in the next month (which is determined based on a churn model) is 1.3 times higher than the probability that a plurality of customers having the current tenure of 18 months will churn in the next month).

After obtaining the hazard function of customer i, the survival function of the customer i can be determined using the equation (5) above based on the obtained hazard function. More specifically, for each customer i and tenure $t > t_0$ (once again, to is the current tenure), $$S_i(t) = \prod_{j=t_0}^{t} [1 - h_i(j)].$$

where $S_i(t)$ is the survival function of the customer i, to is the current tenure of the customer i, t is the future tenure of the customer i, and j is an incremental value increased from the current tenure to the future tenure.

Then, the mathematical expectation of remaining tenure of customer i may be expressed as:

$$E(RT_i) = \sum_{j=0}^{\infty} S_i(t_0 + j) \quad (8)$$

Because $S_i(t_0+j)$ becomes smaller as j increases (meaning that the survival function will converge), the sum's incremental values become increasingly smaller. Thus, in some embodiments, instead of performing the summing to infinity, the summing can be terminated when $S_i(t_0+j)$ becomes sufficiently small.

$$E(RT_i) = \sum_{j=0}^{j_{converge}} S_i(t_0 + j)$$

Once $E(RT_i)$ of customer i is determined, the CLV of customer i can be determined using the equation—CLV=M× E(RT).

In some embodiments, there may be provided two separate churn models—one for voluntary churn and another one for involuntary churn. The involuntary churn model is for determining the probability that a customer will involuntarily churn (e.g., cutting a wireless phone service because the customer stopped paying the service fees). In case two separate churn models are used for predicting the churn probabilities, the overall probability of churn needs to be calculated.

One way to calculate the overall probability of churn is by summing up the two churn models' scores. Another way to calculate the overall probability of churn is to treat the voluntary churn and the involuntary churn—the two mutually exclusive events—as competing risks.

For example, two sub-hazard functions corresponding to the two different types of churn may be expressed as: $h_v(t)=P(T_v=t|T\geq t)$ for voluntary churn and $h_{inv}(t)=P(T_{inv}=t|T\geq t)$ for involuntary churn. The overall hazard function may be obtained as: $h(t)=h_v(t)+h_{inv}(t)$.

In the equation (6), the hazard function of customer i is obtained by multiplying the baseline hazard function by a proportionality value $\alpha_i$. But there may be a scenario where the proportionality value needs to be changed. For example, let's assume that a customer of a wireless carrier calls a customer representative of the wireless carrier in order to terminate his/her current wireless service. Let's further assume that the customer representative makes an offer of upgrading the customer's wireless device for free in exchange for the customer keeping his/her wireless service for the next year or two years, and the customer accepts the offer.

In this scenario, the customer's churn model score may reflect this intervention (i.e., the customer keeping his/her wireless service in response to the offer), but it is likely that the effect of this intervention will not last forever. Rather, the effect may be temporary, meaning that the effect will decay over a period of time (e.g., within a few months). This means that the customer's $h_i(t_0)$ (which is determined using the churn model score) becomes inaccurate, and thus the proportionality value $\alpha_i$ (which is determined based on $h_i(t_0)$) becomes inaccurate.

Accordingly, in some embodiments, the CLV time horizon ($j_{max}$) that is used to predict the CLV is reduced to a shorter period (e.g., several months instead of several years).

$$CLV = M \times E(RT_i) = M \times \sum_{j=0}^{j_{max}} S_i(t_0 + j)$$

Alternatively, in other embodiments, the above described temporary effects are factored into the baseline hazard function $h_0(t)$ by adding another argument z into the baseline hazard function such that the baseline hazard function becomes $h_0(t, z)$, where t is the customer's tenure and z is the number of months since the last intervention (e.g., offering a free wireless device upgrade) was made. If there was no intervention, z may be set to be a constant value (e.g., −1).

Then, for all $t \geq t_0$ and $z \geq z_0$, the hazard function of customer i may be expressed as:

$$h_i(t, z) = h_0(t, z) \times \frac{h_i(t_0, z_0)}{h_0(t_0, z_0)},$$

where $t_0$ is the current tenure of the customer i, $z_0$ is the number of months (in case the time unit is month) since the last intervention was made for customer i, $h_i(t_0, z_0)$ is the probability that the customer i will churn over the next month (which may be determined using a churn model).

Figure 5:
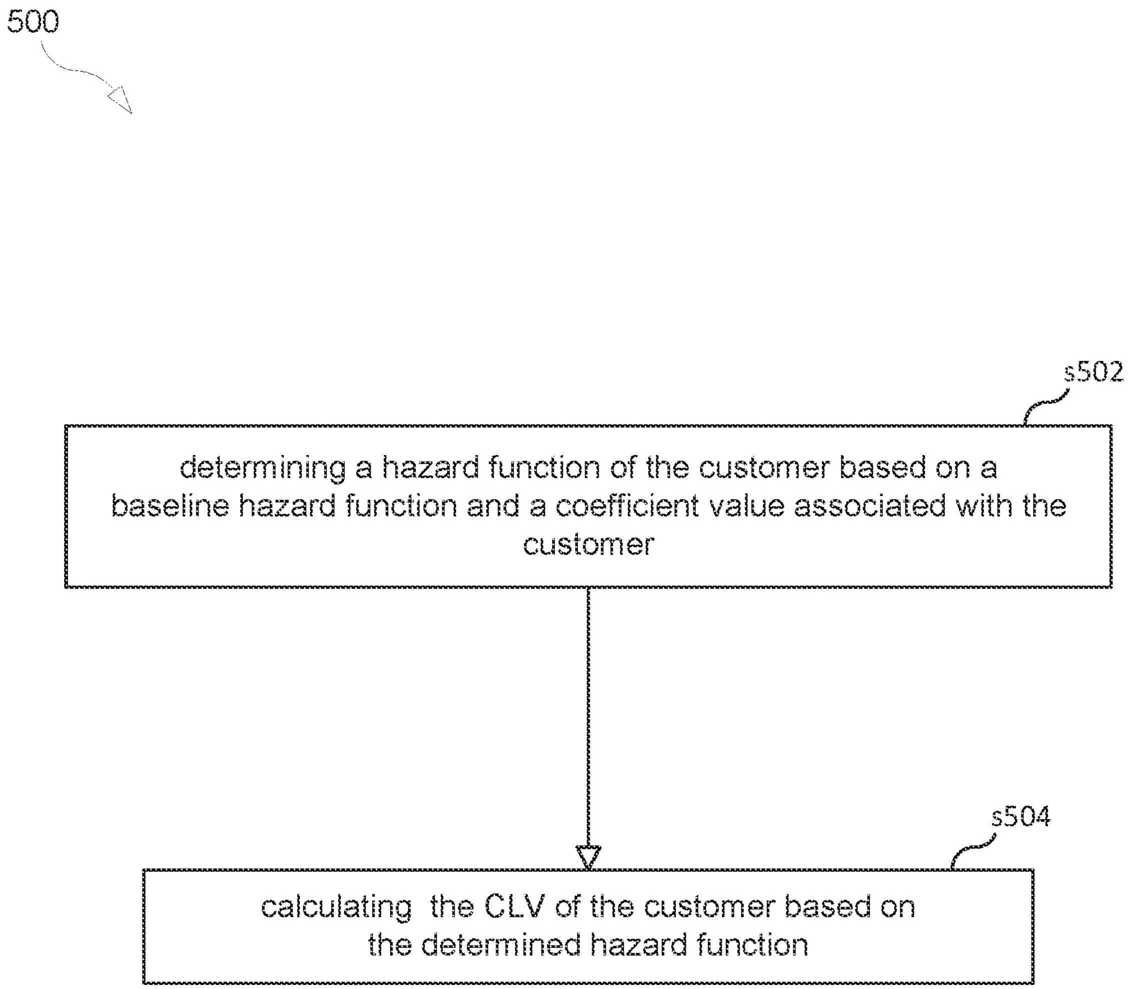
FIG. 5 shows a process according to some embodiments.

FIG. 5 shows a process 500 for determining a customer lifetime value (CLV) of a customer. Process 500 may begin with step s502. Step s502 comprises determining a hazard function of the customer based on a baseline hazard function and a coefficient value associated with the customer. Step s504 comprises calculating the CLV of the customer based on the determined hazard function, wherein the determined hazard function is for calculating a probability that the customer will churn during a time interval.

In some embodiments, the coefficient value associated with the customer is determined based on a first probability value (e.g., $h_0(t_0)$) indicating that a group of customers will churn during a current tenure of the customer and a second probability value (e.g., $h_i(t_0)$) indicating that the customer will churn during the current tenure of the customer.

In some embodiments, the second probability value is generated using a churn model based on a current tenure value indicating the current tenure of the customer, and the churn model is configured to predict a probability that the customer will churn in a time interval.

In some embodiments, the coefficient value associated with the customer is determined based on the second probability value divided by the first probability value.

In some embodiments, the method comprises using the determined hazard function, determining a survival function of the customer. The survival function is for calculating a probability that the customer will remain as a customer during a time interval.

In some embodiments, $$S(t) = \prod_{j=t_0}^{t} [1 - h(j)],$$

where S(t) is the survival function having a parameter t, the parameter t corresponds to a first tenure value indicating a tenure of the customer, $t_0$ is a current tenure value indicating the current tenure of the customer, h(j) is the hazard function having a parameter j, and the parameter j corresponds to an incremental value increased from the current tenure value to the first tenure value.

In some embodiments, calculating the CLV of the customer based on the determined hazard function comprises calculating the CLV of the customer based on the survival function.

In some embodiments, calculating the CLV of the customer based on the survival function comprises calculating the CLV based on $$\sum_{j=0}^{t_{merge}} S(t_0 + j),$$

where S is the survival function having $t_0+j$ as a variable, j is an incremental value that is greater than or equal to 0, and $t_{merge}$ corresponds to a length of a time interval.

In some embodiments, CLV is calculated further based on an expected profit value or an expected revenue value associated with the customer.

In some embodiments, each of the hazard function and the baseline hazard function is a function of at least two variables including a first variable and a second variable, the first variable corresponds to a tenure value indicating a tenure of the customer, and the second variable corresponds to a length of time elapsed since an occurrence of an event.

As discussed above, in some exemplary embodiments, the CLV of a customer may be used for pairing a contact (e.g., a customer) with an agent (e.g., a customer representative). Accordingly, in some embodiments, a contact center system is provided. The contact center system may employ a pairing node that functions to assign contacts to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

Figure 1A:
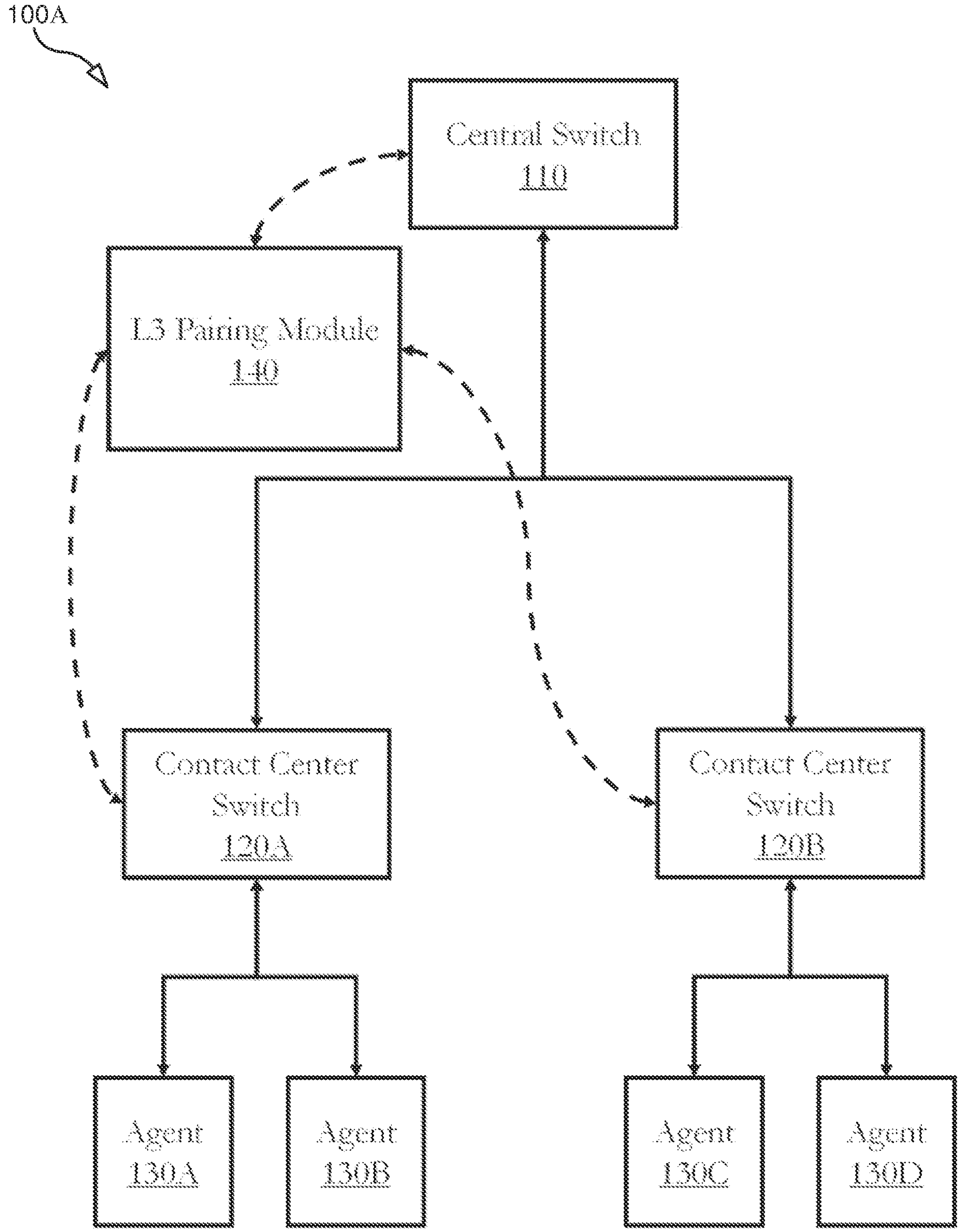
FIG. 1A illustrates an example communication system according to an embodiment.

FIG. 1A illustrates an example communication system 100. In this example, communication system 100A is a contact center system. As shown in FIG. 1A, the communication system 100A may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more Private Branch Exchanges (PBXs) and/or Automatic Call Distributers (ACDs) or other queuing or switching components, including other Internet-based, cloud-based, or otherwise networked contact-agent hardware or software-based contact center solutions.

The central switch 110 may not be necessary such as if there is only one contact center, or if there is only one PBX/ACD routing component, in the communication system 100. If more than one contact center is part of the communication system 100, each contact center may include at least one contact center switch (e.g., contact center switches 120A and 120B). The contact center switches 120A and 120B may be communicatively coupled to the central switch 110. In embodiments, various topologies of routing and network components may be configured to implement the contact center system.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1A, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The communication system 100A may also be communicatively coupled to an integrated service from, for example, a third party vendor. In the example of FIG. 1A, a pairing node 140 may be communicatively coupled to one or more switches in the switch system of the communication system 100, such as central switch 110, contact center switch 120A, or contact center switch 120B. In some embodiments, switches of the communication system 100A may be communicatively coupled to multiple pairing nodes. In some embodiments, pairing node 140 may be embedded within a component of a contact center system (e.g., embedded in or otherwise integrated with a switch). The pairing node 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing nodes. In some embodiments, one or more pairing nodes may be components of pairing node 140 or one or more switches such as central switch 110 or contact center switches 120A and 120B. In some embodiments, a pairing node may determine which pairing node may handle pairing for a particular contact. For example, the pairing node may alternate between enabling pairing via a Behavioral Pairing (BP) strategy and enabling pairing with a First-in-First-out (FIFO) strategy. In other embodiments, one pairing node (e.g., the BP pairing node) may be configured to emulate other pairing strategies.

Figure 1B:
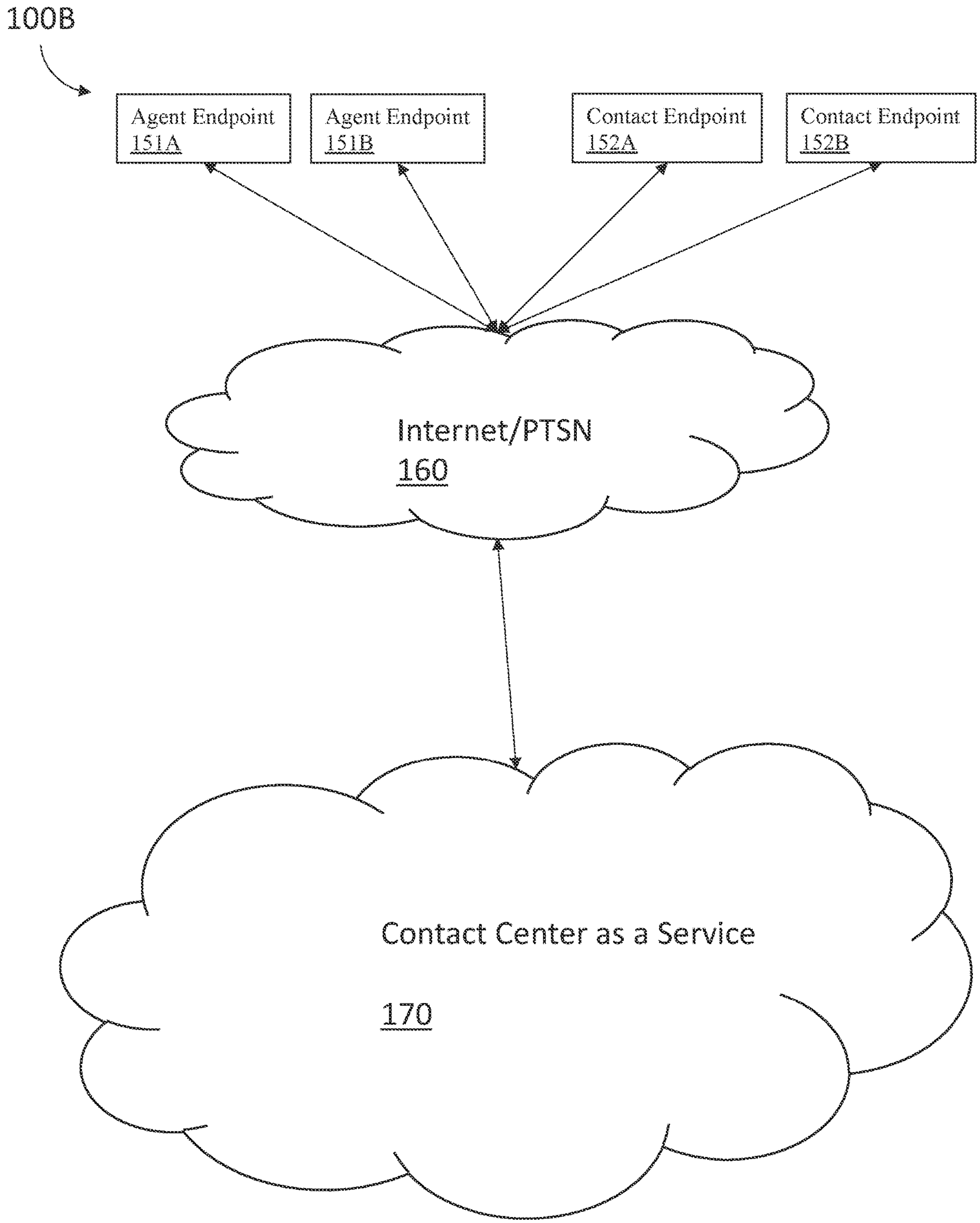
FIG. 1B illustrates an example communication system according to an embodiment.

FIG. 1B illustrates a second example communication system 100B. As shown in FIG. 1B, the communication system 100B may include one or more agent endpoints 151A, 151B and one or more contact endpoints 152A, 152B. The agent endpoints 151A, 151B may include an agent terminal and/or an agent computing device (e.g., laptop, cellphone). The contact endpoints 151A, 151B may include a contact terminal and/or a contact computing device (e.g., laptop, cellphone). Agent endpoints 151A, 151B and/or contact endpoints 152A, 152B may connect to a Contact Center as a Service (CCaaS) 170 through either the Internet or a public switched telephone network (PSTN), according to the capabilities of the endpoint device.

Figure 1C:
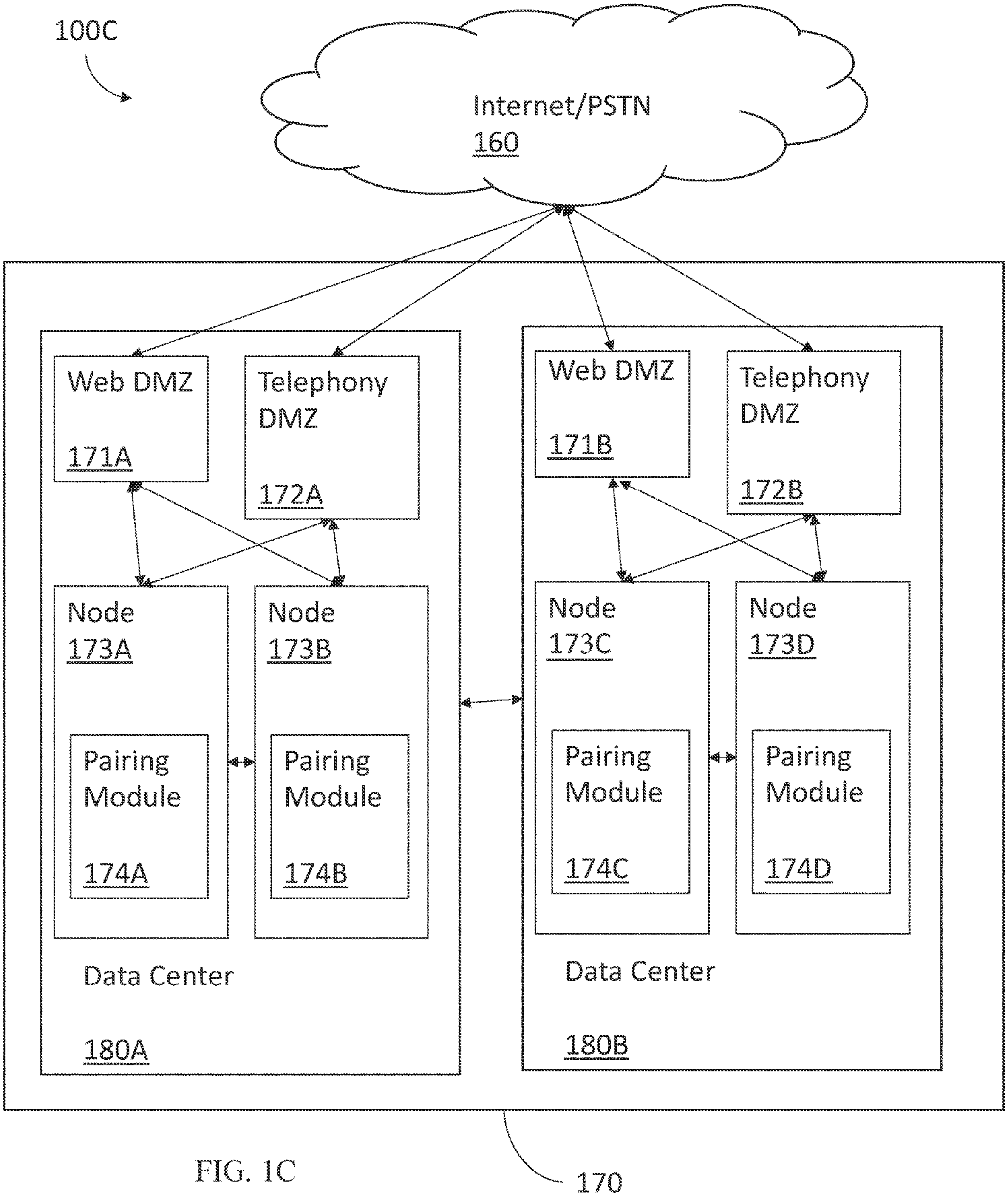
FIG. 1C illustrates an example communication system according to an embodiment.

FIG. 1C illustrates an example communication system 100C with an example configuration of a CCaaS 170. For example, a CCaaS 170 may include multiple data centers 180A, 180B. The data centers 180A, 180B may be separated physically, even in different countries and/or continents. The data centers 180A, 180B may communicate with each other. For example, one data center is a backup for the other data center; so that, in some embodiments, only one data center 180A or 180B receives agent endpoints 151A, 151B and contact endpoints 152A, 152B at a time.

Each data center 180A, 180B includes web demilitarized zone equipment 171A and 171B, respectively, which is configured to receive the agent endpoints 151A, 151B and contact endpoints 152A, 152B, which are communicatively connecting to CCaaS via the Internet. Web demilitarized zone (DMZ) equipment 171A and 171B may operate outside a firewall to connect with the agent endpoints 151A, 151B and contact endpoints 152A, 152B while the rest of the components of data centers 180A, 180B may be within said firewall (besides the telephony DMZ equipment 172A, 172B, which may also be outside said firewall). Similarly, each data center 180A, 180B includes telephony DMZ equipment 172A and 172B, respectively, which is configured to receive agent endpoints 151A, 151B and contact endpoints 152A, 152B, which are communicatively connecting to CCaaS via the PSTN. Telephony DMZ equipment 172A and 172B may operate outside a firewall to connect with the agent endpoints 151A, 151B and contact endpoints 152A, 152B while the rest of the components of data centers 180A, 180B (excluding web DMZ equipment 171A, 171B) may be within said firewall.

Further, each data center 180A, 180B may include one or more nodes 173A, 173B, and 173C, 173D, respectively. All nodes 173A, 173B and 173C, 173D may communicate with web DMZ equipment 171A and 171B, respectively, and with telephony DMZ equipment 172A and 172B, respectively. In some embodiments, only one node in each data center 180A, 180B may be communicating with web DMZ equipment 171A, 171B and with telephony DMZ equipment 172A, 172B at a time.

Each node 173A, 173B, 173C, 173D may have one or more pairing modules 174A, 174B, 174C, 174D, respectively. Similar to pairing module 140 of communications system 100A of FIG. 1A, pairing modules 174A, 174B, 174C, 174D may pair contacts to agents. For example, the pairing module may alternate between enabling pairing via a Behavioral Pairing (BP) module and enabling pairing with a First-in-First-out (FIFO) module. In other embodiments, one pairing module (e.g., the BP module) may be configured to emulate other pairing strategies.

Figure 1D:
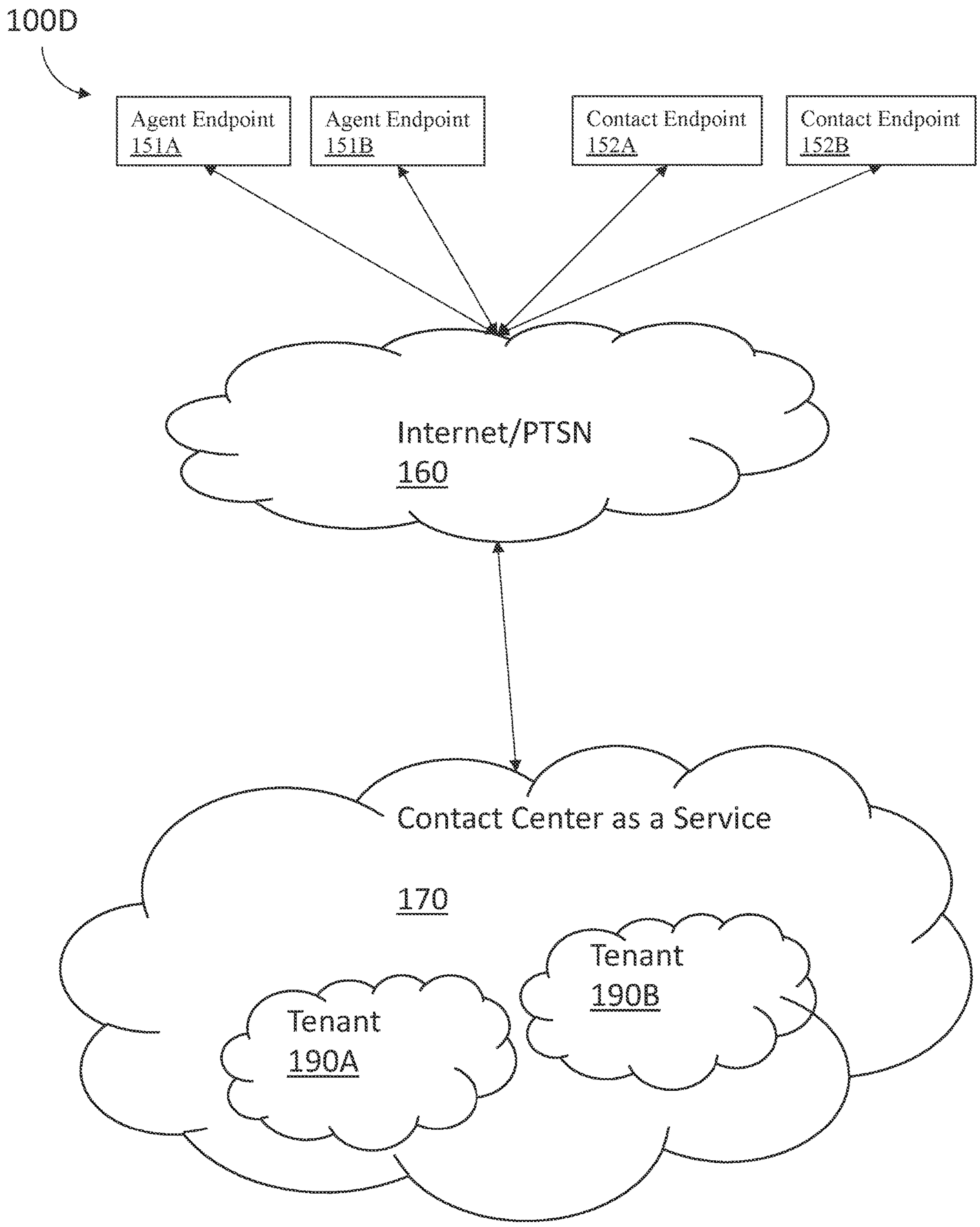
FIG. 1D illustrates an example communication system according to an embodiment.

Turning now to FIG. 1D, the disclosed CCaaS communication systems (e.g., FIGS. 1B and/or 1C) may support multi-tenancy such that multiple contact centers (or contact center operations or businesses) may be operated on a shared environment. That is, multiple tenants, each with their own set of non-overlapping agents, may be handled by the disclosed CCaaS communication systems, where each agent is only interacting with the contacts of a single tenant. CCaaS 170 is shown in FIG. 1D as comprising two tenants 190A and 190B. Turning back to FIG. 1C, for example, multi-tenancy may be supported by node 173A supporting tenant 190A while node 173B supports 190B. In another embodiment, data center 180A supports tenant 190A while data center 180B supports tenant 190B. In another example, multi-tenancy may be supported through a shared machine or shared virtual machine; such at node 173A may support both tenants 190A and 190B, and similarly for nodes 173B, 173C, and 173D.

In other embodiments, the system may be configured for a single tenant within a dedicated environment such as a private machine or private virtual machine.

Figure 2:
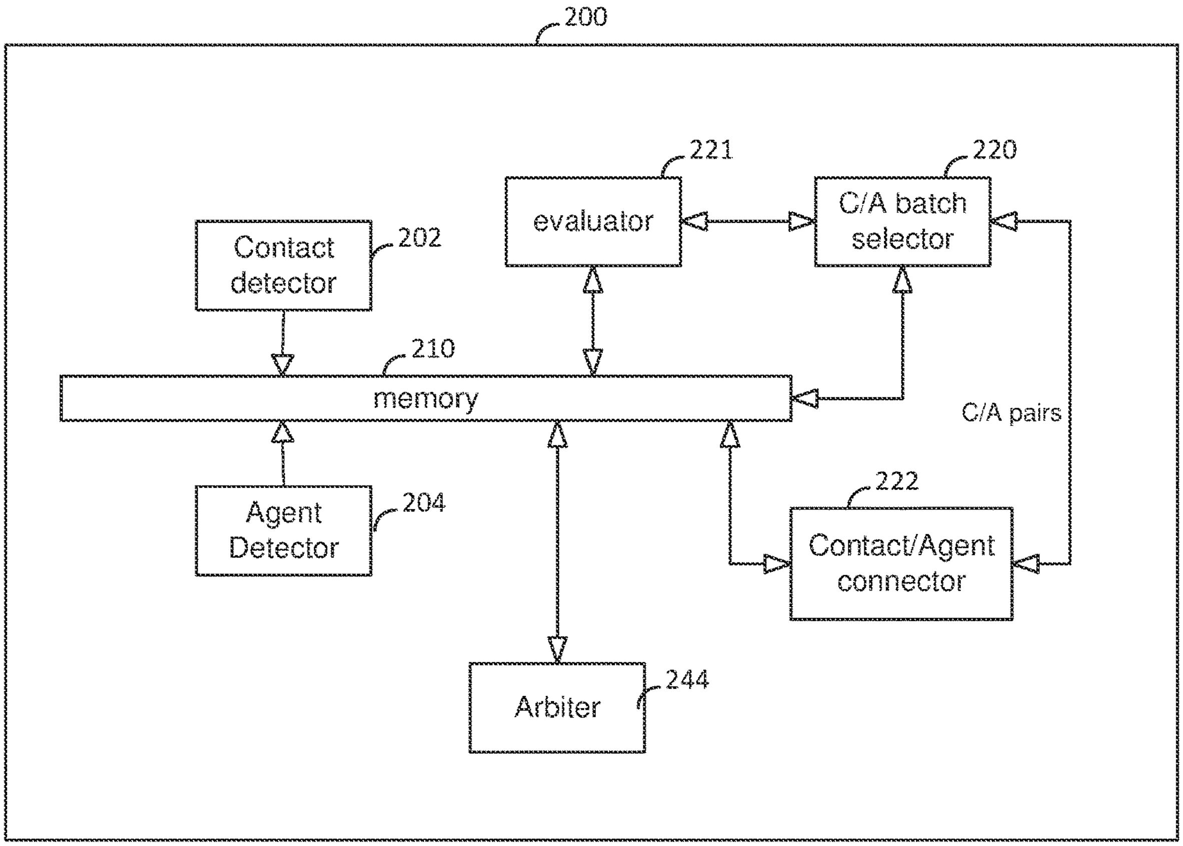
FIG. 2 illustrates a pairing node of a contact center according to an embodiment.

FIG. 2 illustrates an example pairing node 200 according to one embodiment (that is, for example, L3 pairing node 140 of FIG. 1A, or nodes 173A, 173B, 173C, 173D may be implemented using pairing node 200). In the embodiment shown, pairing node 200 includes a memory 210 (e.g., random access memory RAM) such as dynamic RAM (DRAM) or static RAM (SRAM)) for storing contact center information that identifies: (i) a set of contact identifiers (IDs) associated with contacts available for pairing (i.e., contacts waiting to be connected to an agent) and (ii) a set of agent IDs associated with agents available for pairing. In some embodiments, the contact center information includes: i) for each contact ID, metadata for the contact associated with the contact ID (this metadata may include state information indicating whether the contact is available (i.e., waiting to be paired), a score assigned to the contact and/or information about the contact) and ii) for each agent ID, metadata for the agent associated with the agent ID (this metadata may include state information indicating whether the agent is available, a score assigned to the agent and/or information about the agent).

Exemplary information about the contacts and/or agents that may be stored in memory 210 and is associated with the contact ID or agent ID includes: attributes, arrival time, hold time or other duration data, estimated wait time, historical contact-agent interaction data, agent percentiles, contact percentiles, a state (e.g., 'available' when a contact or agent is waiting for a pairing, 'abandoned' when a contact disconnects from the contact center, 'connected' when a contact is connected to an agent or an agent is connected to a contact, 'completed' when a contact has completed an interaction with an agent, 'unavailable' when an agent disconnects from the contact center) and patterns associated with the agents and/or contacts.

Pairing node 200 also includes several modules (software and/or hardware components) (e.g., microservices) including a contact detector 202 and an agent detector 204. Contact detector 202 is operable to detect an available contact (e.g., contact detector 202 may be in communication with a switch that signals contact detector 202 whenever a new contact calls the contact center) and, in immediate response to detecting the available contact, store in memory 210 at least a contact ID associated with the detected contact (the metadata described above may also be stored in association with the contact ID). Similarly, agent detector 204 is operable to detect when an agent becomes available and, in immediate response to detecting the agent becoming available, store in memory 210 at least an agent identifier uniquely associated with the detected agent (metadata pertaining to the identified agent may also be stored in association with the agent ID). In this way, as soon as a contact/agent becomes available, memory 210 will be updated to include the corresponding contact/agent identifier and state information indicating that the contact/agent is available. Hence, at any given point in time, memory 210 will contain a set of zero or more contact identifiers where each is associated with a different contact waiting to be connected to an agent, and a set of zero or more agent identifiers where each is associated with a different available agent.

Pairing node 200 further includes other modules (e.g., microservices) including: (i) a contact/agent (C/A) batch selector 220 that functions to identify (e.g., based on the state information) sets of available contacts and agents for pairing, and provide state updates (i.e., modify the state information) for contacts and agents once the contacts and agents are selected for pairing and (ii) a C/A pairing evaluator 221 that functions to evaluate information associated with available contacts and information associated with available agents in order to propose contact-agent pairings. As shown in FIG. 2, C/A batch selector 220 is in communication with memory 210, and, thereby, can read from memory 210 the contact center information stored therein (e.g., a set of contact IDs where each contact ID identifies an available contact and a set of agent IDs where each agent ID identifies an available agent). In one embodiment, C/A batch selector 220 is configured to occasionally (e.g., periodically) read memory 210 to obtain a list of available contacts and available agents based on a state associated with the agents and contacts listed in the memory 210. Further, the C/A batch selector 220 is in contact with a C/A pairing evaluator 221, and, after obtaining a list of available contacts and available agents, the C/A batch selector 220 may send the list to the C/A pairing evaluator 221 (e.g., sending contact IDs and agent IDs to the C/A pairing evaluator 221).

After the C/A pairing evaluator 221 receives a set of contact IDs and agent IDs from the C/A batch selector 220, the C/A pairing evaluator 221 may read from memory 210 further information about the received contact IDs and agent IDs. The C/A pairing evaluator 221 uses the read information in order to identify and propose agent-contact pairings for the received contact IDs and agent IDs based on a pairing strategy, which, depending on the pairing strategy used and the available contacts and agents, may result in no contact/agent pairings, a single contact/agent pairing, or a plurality of contact agent pairings.

Upon identifying contact/agent pairing(s), the C/A pairing evaluator 221 sends the set of contact/agent pairing(s) to the batch selector 220. The C/A batch selector 220 provides the set of contact/agent pairing(s) to a contact/agent connector 222 (e.g., if the contact associated with contact ID C12 is paired with the agent associated with the agent ID A7, then C/A batch selector 220 provides these contact/agent IDs to contact/agent connector 222). If the pairing process results in one or more contact/agent pairings, then, for each contact/agent pairing, C/A batch selector 220 will transmits an updated state associated with each contact ID and each agent ID in the one or more contact/agent pairings to memory 210, which is then associated with each contact ID and agent ID. Thereby, memory 210 retains the contact IDs and agent IDs for future analysis.

Contact/agent connector 222 functions to connect the identified agent with the paired identified contact. Further, C/A connector 222 transmits an updated state associated with each contact ID and each agent ID in the one or more contact/agent pairings to memory 210, which is then associated with each contact ID and agent ID.

Therefore, in one embodiment, pairing node 200 provides an asynchronous polling process where memory 210 provides a central repository that is read and updated by the contact detector 202, agent detector 204, C/A batch selector 220, C/A pairing evaluator 221, and C/A connector 222. Accordingly, the objects of each agent and contact do not move between the microservices of pairing node 200; instead identifiers associated with the objects are transmitted between the contact detector 202, agent detector 204, memory 210, C/A batch selector 220, C/A pairing evaluator 221, and C/A connector 222. This process conserves bandwidth, processing power, memory associated with each microservice, and is more expedient than conventional event-based pairing nodes.

As noted above, it is advantageous for a communication system, such as, for example, communication systems 100A, 100B, 100C, 100D, to achieve high availability. Accordingly, in the embodiments disclosed herein an active-standby redundant deployment model is employed.

Figure 6:
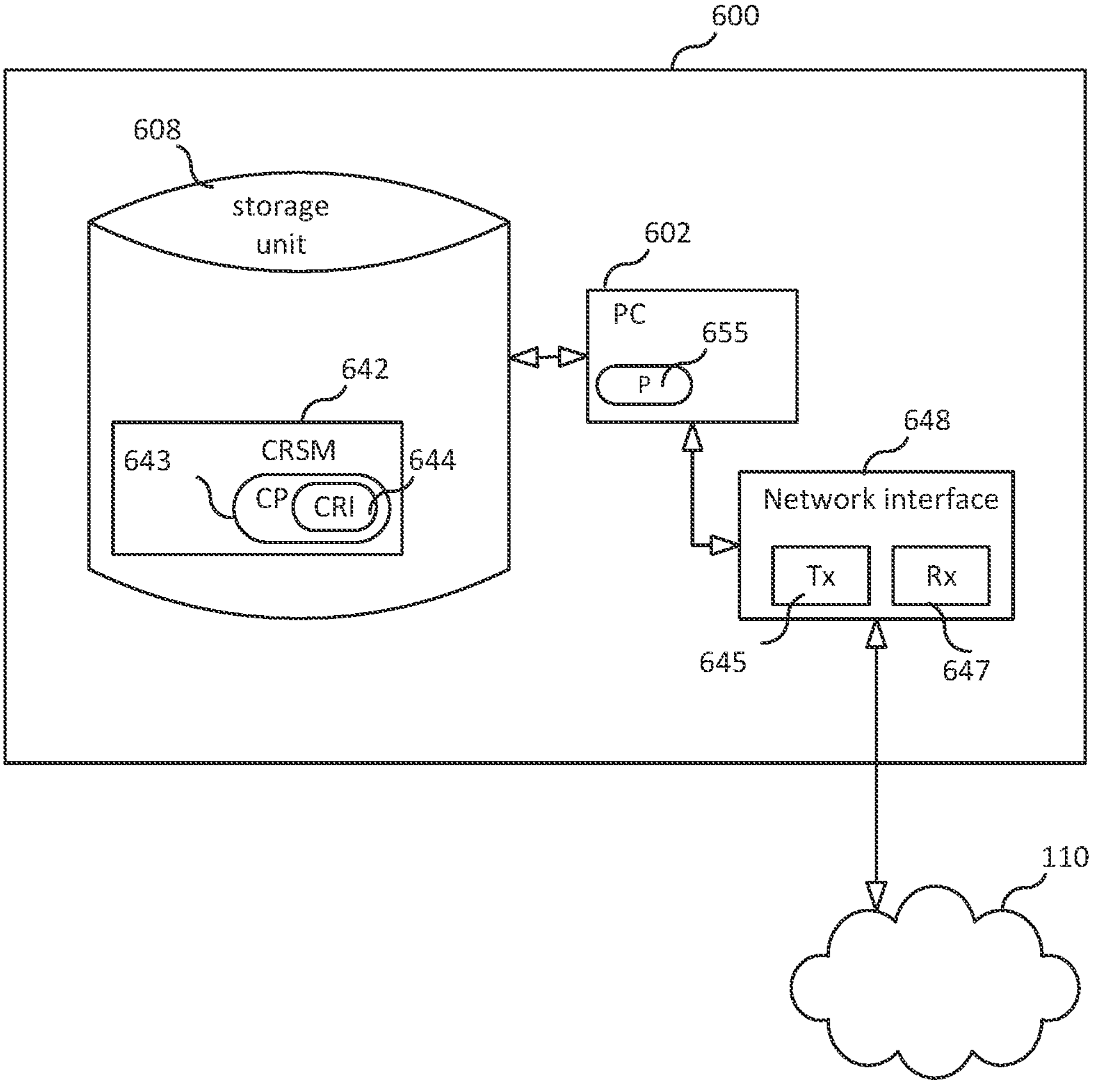
FIG. 6 shows an apparatus according to some embodiments.

FIG. 6 is a block diagram of an apparatus 600, according to some embodiments. The apparatus 600 may be used to implement any of the elements 200, 202, 204, 220, 221, 222, and 244. As shown in FIG. 6, apparatus 600 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., node 600 may be a distributed computing apparatus); at least one network interface 649 (e.g., a physical interface or air interface) comprising a transmitter (Tx) 645 and a receiver (Rx) 647 for enabling node 600 to transmit data to and receive data from other nodes connected to a network 110

(e.g., an Internet Protocol (IP) network) to which network interface 649 is connected (physically or wirelessly) (e.g., network interface 649 may be coupled to an antenna arrangement comprising one or more antennas for enabling node 600 to wirelessly transmit/receive data); and a storage unit (a.k.a., "data storage system") 609, which may include one or more non-volatile storage devices and/or one or more volatile storage devices. In embodiments where PC 602 includes a programmable processor, a computer readable storage medium (CRSM) 642 may be provided. CRSM 642 may store a computer program (CP) 643 comprising computer readable instructions (CRI) 644. CRSM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes node 600 to perform steps described herein (e.g., steps described herein with reference to the flow charts). In other embodiments, node 600 may be configured to perform steps described herein without the need for code. That is, for example, PC 602 may consist merely of one or more ASICs. Hence, the features of the embodiments described herein may be implemented in hardware and/or software.

Figure 7:
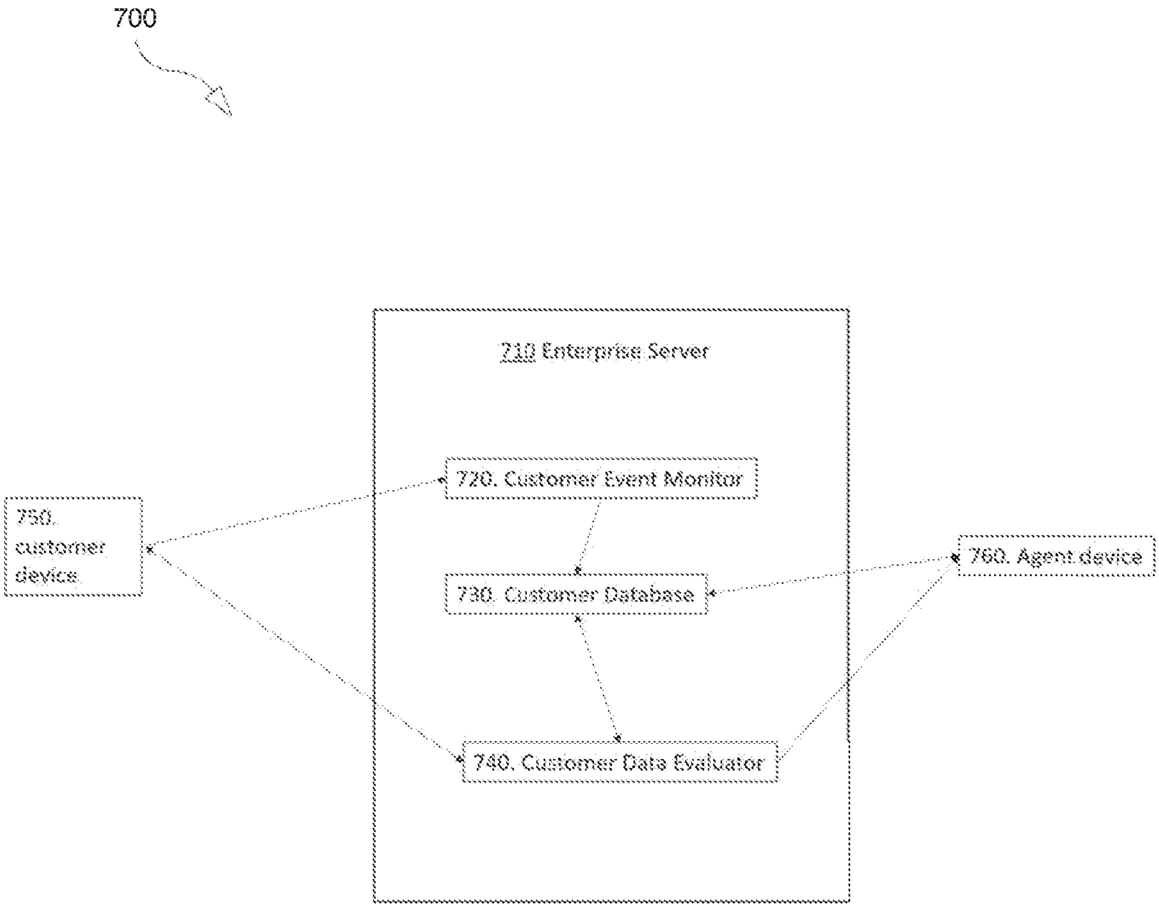
FIG. 7 shows an example system according to some embodiments.

FIG. 7 shows an example system 700 according to some embodiments. System 700 comprises a customer event monitor 720, a customer database 730, a customer data evaluator 740, a customer device 750, and an agent device 760. Customer event monitor 720, customer database 730, and customer data evaluator 740 may be included in a single device—enterprise server 710. The number of each entity shown in FIG. 7 is provided for illustration purpose only, and does not limit the embodiments of this disclosure in any way.

In one exemplary scenario, a customer contacts a service/sales representative (a.k.a., "agent") using customer device 750 (e.g., a laptop, a desktop, a mobile phone, a tablet, etc.), and an interaction (e.g., the customer buying a product/service, subscribing to a service, returning a product/service, or canceling a subscription) occurs between the customer and the representative. The interaction history is monitored and/or collected by customer event monitor 720 and is saved in customer database 730 by customer event monitor 720. Note that the data stored in customer database 730 may be associated with a particular customer identifier. Customer data evaluator 740 may retrieve data stored in customer database 730, and run analytics (e.g., calculating a CLV) on the retrieved data.

Based on the analysis, customer data evaluator 740 may output values (e.g., CLV, a discount offer) related to customer's interaction with a company/service/product. In some embodiments, customer data evaluator 704 may store the output values in customer database 730. Also customer data evaluator 704 may transmit to agent device 760 the output values (e.g., CLV, the discount offer, etc.). Agent device 760 may take an appropriate action (e.g., formulating based on the CLV it received from customer data evaluator 704 a counter-offer to a customer who contacted the agent to terminate a subscription service). In some embodiments, data related to the action taken by agent device 760 may also be stored in the database 730.

SUMMARY OF VARIOUS EMBODIMENTS

A1. A method (500) of determining a customer lifetime value (CLV) of a customer, the method comprising:

determining (s502) a hazard function (e.g., $h_i(t)$ of the customer based on a baseline hazard function and a coefficient value associated with the customer; and calculating (s504) the CLV of the customer based on the determined hazard function, wherein the determined hazard function is for calculating a probability that the customer will churn during a time interval (e.g., t).

A2. The method of embodiment A1, wherein the coefficient value associated with the customer is determined based on a first probability value (e.g., $h_0(t_0)$) indicating that a group of customers will churn during a current tenure of the customer and a second probability value (e.g., $h_i(t_0)$) indicating that the customer will churn during the current tenure of the customer.

A3. The method of embodiment A2, wherein the second probability value is generated using a churn model based on a current tenure value indicating the current tenure of the customer, and the churn model is configured to predict a probability that the customer will churn in a time interval.

A4. The method of embodiment A2 or A3, wherein the coefficient value associated with the customer is determined based on the second probability value divided by the first probability value.

A5. The method of any one of embodiments A1-A4, comprising:

using the determined hazard function, determining a survival function of the customer, wherein the survival function is for calculating a probability that the customer will remain as a customer during a time interval.

A6. The method of embodiment A5, wherein $$S(t) = \prod_{j=t_0}^{t} [1 - h(j)],$$

where S(t) is the survival function having a parameter t, the parameter t corresponds to a first tenure value indicating a tenure of the customer, $t_0$ is a current tenure value indicating the current tenure of the customer, h(j) is the hazard function having a parameter j, and the parameter j corresponds to an incremental value increased from the current tenure value to the first tenure value.

A7. The method of embodiment A5 or A6, wherein calculating the CLV of the customer based on the determined hazard function comprises:

calculating the CLV of the customer based on the survival function.

A8. The method of embodiment A7, wherein calculating the CLV of the customer based on the survival function comprises calculating the CLV based on $$\sum_{j=0}^{t_{merge}} S(t_0 + j),$$

where S is the survival function having $t_0$+j as a variable, j is an incremental value that is greater than or equal to 0, and $t_{merge}$ corresponds to a length of a time interval.

A9. The method of embodiment A8, wherein CLV is calculated further based on an expected profit value or an expected revenue value associated with the customer.

A10. The method of any one of embodiments A1-A9, wherein each of the hazard function and the baseline hazard function is a function of at least two variables including a first variable and a second variable, the first variable corresponds to a tenure value indicating a tenure of the customer, and the second variable corresponds to a length of time elapsed since an occurrence of an event (e.g., the timing at which the customer accepts an offer made by an agent after the customer tried to terminate the service).

B1. A computer program (643) comprising instructions (644) which when executed by processing circuitry (602) of an apparatus causes the apparatus to perform the method of at least one of embodiments A1-A10.

B2. A carrier containing the computer program of embodiment B1, wherein the carrier is one of an electronic signal, an optical signal, a radio signal, and a computer readable storage medium (642).

C1. An apparatus (600), the apparatus being configured to perform the method of at least one of embodiments A1-A10.

While some of the terminology in this disclosure is described in terms of VVC, the embodiments of this disclosure also apply to any existing or future codec, which may use a different, but equivalent terminology.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method in a contact routing system for connecting contacts to agents, wherein the contact routing system comprises:

a set of switches comprising a first switch;

a first communication device associated with a first agent, the first communication device being connected to at least one of the switches in the set of switches;

a second communication device associated with a second agent, the second communication device being connected to at least one of the switches in the set of switches; and a first pairing node comprising:

a memory; and a plurality of microservices comprising:

a contact-agent (CA) connector microservice; and a CA pairing evaluator microservice, and the method comprises:

for a first contact, generating a first hazard function using a baseline hazard function and a first coefficient value associated with a first contact identifier (CID) for identifying the first contact;

for a second contact, generating a second hazard function using the baseline hazard function and a second coefficient value associated with a second CID for identifying the second contact;

calculating a first contact lifetime value (CLV) using the first hazard function generated for the first contact;

calculating a second CLV using the second hazard function generated for the second contact;

the CA pairing evaluator using the first CLV to pair the first contact with a first agent;

the CA pairing evaluator using the second CLV to pair the second contact with a second agent;

after the first contact is paired with the first agent, the CA connector causing the first switch to communicatively connect the first contact with the first communication device associated with the first agent; and after the second contact with the second agent, the CA connector causing the first switch or a second switch of the contact routing system to communicatively connect the second contact with the second communication device associated with the second agent, wherein the first hazard function is for calculating a probability that the first contact will churn during a time interval, and the second hazard function is for calculating a probability that the second contact will churn during the time interval.

2. The method of claim 1, wherein the first coefficient value associated with the first CID is determined based on a first probability value indicating that a group of contacts will churn during a current tenure of the first contact and a second probability value indicating that first contact will churn during the current tenure of the first contact.

3. The method of claim 2, wherein the second probability value is generated using a churn model based on a current tenure value indicating the current tenure of the first contact, and the churn model is configured to predict a probability that the first contact will churn in a time interval.

4. The method of claim 2, wherein the first coefficient value associated with the first CID is determined based on the second probability value divided by the first probability value.

5. The method of claim 1, comprising:

using the determined first hazard function, determining a survival function of the first contact, wherein the survival function is for calculating a probability that the first contact will remain as a customer during a time interval.

6. The method of claim 5, wherein $$S(t) = \prod_{j=t_0}^{T} [1 - h(j)],$$

where S(t) is the survival function having a parameter t, the parameter t corresponds to a first tenure value indicating a tenure of the first contact, $t_0$ is a current tenure value indicating the current tenure of the first contact, h(j) is the first hazard function having a parameter j, and the parameter j corresponds to an incremental value increased from the current tenure value to the first tenure value.

7. The method of claim 6, wherein calculating the first CLV based on the determined first hazard function comprises:

calculating the first CLV based on the survival function.

8. The method of claim 7, wherein calculating the first CLV based on the survival function comprises calculating the first CLV based on $$\sum_{j=0}^{t_{merge}} S(t_0+j),$$

where S is the survival function having $t_0$+j as a variable, j is an incremental value that is greater than or equal to 0, and $t_{merge}$ corresponds to a length of a time interval.

9. The method of claim 8, wherein the first CLV is calculated further based on an expected profit value or an expected revenue value associated with the first contact.

10. The method of claim 1, wherein each of the first hazard function and the baseline hazard function is a function of at least two variables including a first variable and a second variable, the first variable corresponds to a tenure value indicating a tenure of the first contact, and the second variable corresponds to a length of time elapsed since an occurrence of an event.

11. A contact routing system for connecting contacts to agents, the system comprising:

a set of switches comprising a first switch;

a first communication device associated with a first agent, the first communication device being connected to at least one of the switches in the set of switches;

a second communication device associated with a second agent, the second communication device being connected to at least one of the switches in the set of switches; and a first pairing node comprising:

a memory; and a plurality of microservices comprising:

a contact-agent (CA) connector microservice; and a CA pairing evaluator microservice, wherein the system is configured to perform a method comprising:

for a first contact, generating a first hazard function using a baseline hazard function and a first coefficient value associated with a first contact identifier (CID) for identifying the first contact;

for a second contact, generating a second hazard function using the baseline hazard function and a second coefficient value associated with a second CID for identifying the second contact;

calculating a first contact lifetime value (CLV) using the first hazard function generated for the first contact;

calculating a second CLV using the second hazard function generated for the second contact;

the CA pairing evaluator using the first CLV to pair the first contact with a first agent;

the CA pairing evaluator using the second CLV to pair the second contact with a second agent;

after the first contact is paired with the first agent, the CA connector causing the first switch to communicatively connect the first contact with the first communication device associated with the first agent; and after the second contact with the second agent, the CA connector causing the first switch or a second switch of the contact routing system to communicatively connect the second contact with the second communication device associated with the second agent, wherein the first hazard function is for calculating a probability that the first contact will churn during a time interval, and the second hazard function is for calculating a probability that the second contact will churn during the time interval.

12. The system of claim 11, wherein the first coefficient value associated with the first CID is determined based on a first probability value indicating that a group of contacts will churn during a current tenure of the first contact and a second probability value indicating that the first contact will churn during the current tenure of the first contact.

13. The system of claim 12, wherein the second probability value is generated using a churn model based on a current tenure value indicating the current tenure of the first contact, and the churn model is configured to predict a probability that the first contact will churn in a time interval.

14. The system of claim 12, wherein the coefficient value associated with the first CID is determined based on the second probability value divided by the first probability value.

15. The system of claim 11, wherein the system is configured to, using the determined first hazard function, determine a survival function of the first contact, wherein the survival function is for calculating a probability that the first contact will remain as a customer during a time interval.

16. The system of claim 15, wherein $$S(t) = \prod_{j=t_0}^{t} [1-h(j)],$$

where S(t) is the survival function having a parameter t, the parameter t corresponds to a first tenure value indicating a tenure of the first contact, $t_0$ is a current tenure value indicating the current tenure of the first contact, h(j) is the first hazard function having a parameter j, and the parameter j corresponds to an incremental value increased from the current tenure value to the first tenure value.

17. The system of claim 16, wherein calculating the first CLV based on the determined hazard function comprises:

calculating the first CLV based on the survival function.

18. The system of claim 17, wherein calculating the first CLV of the first contact based on the survival function comprises calculating the first CLV based on $$\sum_{j=0}^{t_{merge}} S(t_0+j),$$

where S if the survival function having $t_0$+j as a variable, j is an incremental value that is greater than or equal to 0, and $t_{merge}$ corresponds to a length of a time interval.

19. The system of claim 18, wherein the first CLV is calculated further based on an expected profit value or an expected revenue value associated with the first contact.

20. The system of claim 11, wherein each of the first hazard function and the baseline hazard function is a function of at least two variables including a first variable and a second variable, the first variable corresponds to a tenure value indicating a tenure of the first contact, and the second variable corresponds to a length of time elapsed since an occurrence of an event.

* * * * *